(12) United States Patent
Gaudreau

(10) Patent No.: US 6,371,705 B1
(45) Date of Patent: Apr. 16, 2002

(54) TOOL HOLDER

(75) Inventor: Jack R. Gaudreau, New Hudson, MI (US)

(73) Assignee: FL Toolholders, Inc., Livonia, MI (US)

( * ) Notice: Subject to any disclaimer, the term of this patent is extended or adjusted under 35 U.S.C. 154(b) by 0 days.

(21) Appl. No.: 09/668,757

(22) Filed: Sep. 22, 2000

(51) Int. Cl.[7] .............................................. B23B 31/10
(52) U.S. Cl. ........................ 409/234; 279/52; 279/156; 408/146; 408/239 R
(58) Field of Search ........................... 279/54, 56, 133, 279/156, 102, 48, 52, 59; 409/234; 29/447; 408/146, 226, 239 R

(56) References Cited

U.S. PATENT DOCUMENTS

| | | | | |
|---|---|---|---|---|
| 3,053,118 A | * | 9/1962 | Lavallee | 408/226 |
| 5,032,043 A | * | 7/1991 | Hollifield | 409/234 |
| 5,582,494 A | * | 12/1996 | Cook | 409/234 |
| 5,979,912 A | * | 11/1999 | Cook | 279/102 |
| 6,035,512 A | * | 3/2000 | Cook | 29/447 |
| 6,071,219 A | * | 6/2000 | Cook | 279/103 |
| 6,234,729 B1 | * | 5/2001 | Cook | 408/226 |

* cited by examiner

Primary Examiner—Daniel W. Howell
(74) Attorney, Agent, or Firm—Gifford, Krass, Groh, Sprinkle, Anderson & Citkowski, P.C.

(57) ABSTRACT

A tool holder is disclosed for a rotary tool having an elongated cylindrical shank. The tool holder includes an HSK body having a cylindrical bore with a predetermined inside diameter. An elongated cylindrical insert has a throughbore or collet pocket and the insert has an outer diameter larger than the inside diameter of the body cylindrical bore. Thus, the insert is insertable into the body cylindrical bore only when the body front nose is heated to a predetermined temperature at which temperature the body thermally expands to an extent that the inside diameter of the body bore is greater than the outer diameter of the insert. Upon subsequent cooling of the body, the body and insert are attached together. A collet is then used to removably and coaxially secure the tool shank to the insert within the insert throughbore. Other inserts may be used such as floating style holders, straight bore, etc.

5 Claims, 2 Drawing Sheets

TOOL HOLDER

BACKGROUND OF THE INVENTION

I. Field of the Invention

The present invention relates generally to tool holders of the type used in industrial applications.

II. Description of the Prior Art

In industrial applications, such as CNC machines, cutting tools are typically mounted to a tool holder which, in turn, is mounted to the rotary driven spindle of a machine. For example, for a CNC machine, HSK tool holders with collet front ends are commonly used since such tool holders may be readily and automatically mounted to the CNC machine spindle. These previously known HSK tool holders, however, have suffered from a number of disadvantages.

One disadvantage of the previously known HSK collet type tool holders is that only a minimal adjustment of the axial position of the tool relative to the tool holder could be achieved. This minimal tool adjustment is typically in the range of about one-quarter of an inch.

A still further disadvantage of the previously known HSK tool holders is that the HSK tool holders utilized collapsible collets in order to secure the tool to the tool holder. These collapsible collets, however, are not known for maintaining precision alignment of the tool relative to the tool holder axis. Furthermore, such tool holders allow tool spin out, i.e. rotation of the tool relative to the collet. These tool holders do not provide a positive drive between the tool holder and the tool. Instead, the tool holder relied solely upon the collapsible collet to secure the tool to the tool holder. As such, tool spin out at relatively low torque forces occurred.

A still further disadvantage of the previously known HSK tool holders is that, in the event of tool spin out, the tool oftentimes scores and otherwise damages the internal bore on the tool holder. The previously known HSK tool holders, however, are non-repairable so that damage to the tool holder from tool spin out oftentimes requires that the entire tool holder be scrapped.

SUMMARY OF THE PRESENT INVENTION

The present invention provides a tool holder which overcomes all of the above-mentioned disadvantages of the previously known devices.

In brief, the tool holder of the present invention comprises a tool body having a cylindrical bore with a predetermined inside diameter. The body is preferably of a standard configuration, e.g. an HSK tool holder body, such that the tool holder of the present invention is interchangeable with existing standard tool holders.

The tool holder further comprises an elongated cylindrical insert having a throughbore or collet pocket. The insert has an outer diameter slightly larger than the inside diameter of the body cylindrical bore so that the insert is insertable into the body cylindrical bore only when the body is heated to a predetermined elevated temperature. At that elevated temperature, e.g. 1000° F., the body thermally expands to an extent such that the inside diameter of the body bore is greater than the outer diameter of the insert. With the body thermally expanded, the insert is inserted into the body bore so that, upon cooling of the body, the body and insert are rigidly and concentrically secured together.

A free end of the body includes external threads which threadably cooperate with an internally threaded collet. The shank of the tool is then inserted through the collet and into the insert throughbore so that, upon subsequent tightening of the collet onto the insert, the collet rigidly and coaxially secures the tool holder shank to the insert and thus to the tool holder body. The collet may be either of the previously known collapsible type, or a precision single slot collet.

In order to provide positive locking of the tool shank to the insert against relative rotation and thus minimize the chance of tool spin out, the inner end of the tool shank includes a noncircular portion, typically two diametrically opposed flats. These flats are received within a recess of a boss which is longitudinally slidably mounted within the insert throughbore. The outer periphery of the boss is noncircular, and preferably square, and longitudinally slides within a like shaped channel formed at the inner end of the insert throughbore. Thus, although the boss is longitudinally slidably mounted within the insert throughbore, rotation of the boss, and thus the tool holder shank, relative to the insert is precluded.

In order to adjust the position of the boss within the insert throughbore, and thus adjust the extent of extension of the cutting tool from the insert, the insert channel, i.e. the portion of the insert in which the boss is axially slidable, is internally threaded. The threaded fastener is then threadably mounted to the insert channel. The threaded fastener is secured to the boss so that the fastener and boss are secured against axial displacement relative to each other, but can rotate relative to each other. Consequently, rotation of the fastener within the insert channel axially adjusts the position of the boss within the channel and thus the longitudinal position of the tool relative to the insert. Axial adjustment of about a minimum of one inch of the boss, and thus of the tool, is achieved.

As will become hereinafter more clearly apparent, the tool holder of the present invention enjoys all of the advantages of the previously known tool holders which utilize collets to secure the tool shank to the tool holder. Additionally, however, the tool holder of the present invention enjoys adjustability of the extension of the cutting tool from the insert as well as modularity, i.e. the inserts and bodies of the tool holder may be maintained as stock items. Furthermore, in the event of damage to the insert by excessive torque, the insert may be freely removed from the body by simply reheating the body, removing the damaged insert, and inserting a new insert. Replacement of the insert, of course, is much less expensive than replacement of the entire tool holder body.

The use of inserts also allows length extension to be incorporated in the insert while maintaining the tool holder body in standard lengths.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 3 is a cross-sectional view taken substantially along line 3—3 in FIG. 2.

DETAILED DESCRIPTION OF A PREFERRED EMBODIMENT OF THE PRESENT INVENTION

Figure 1:
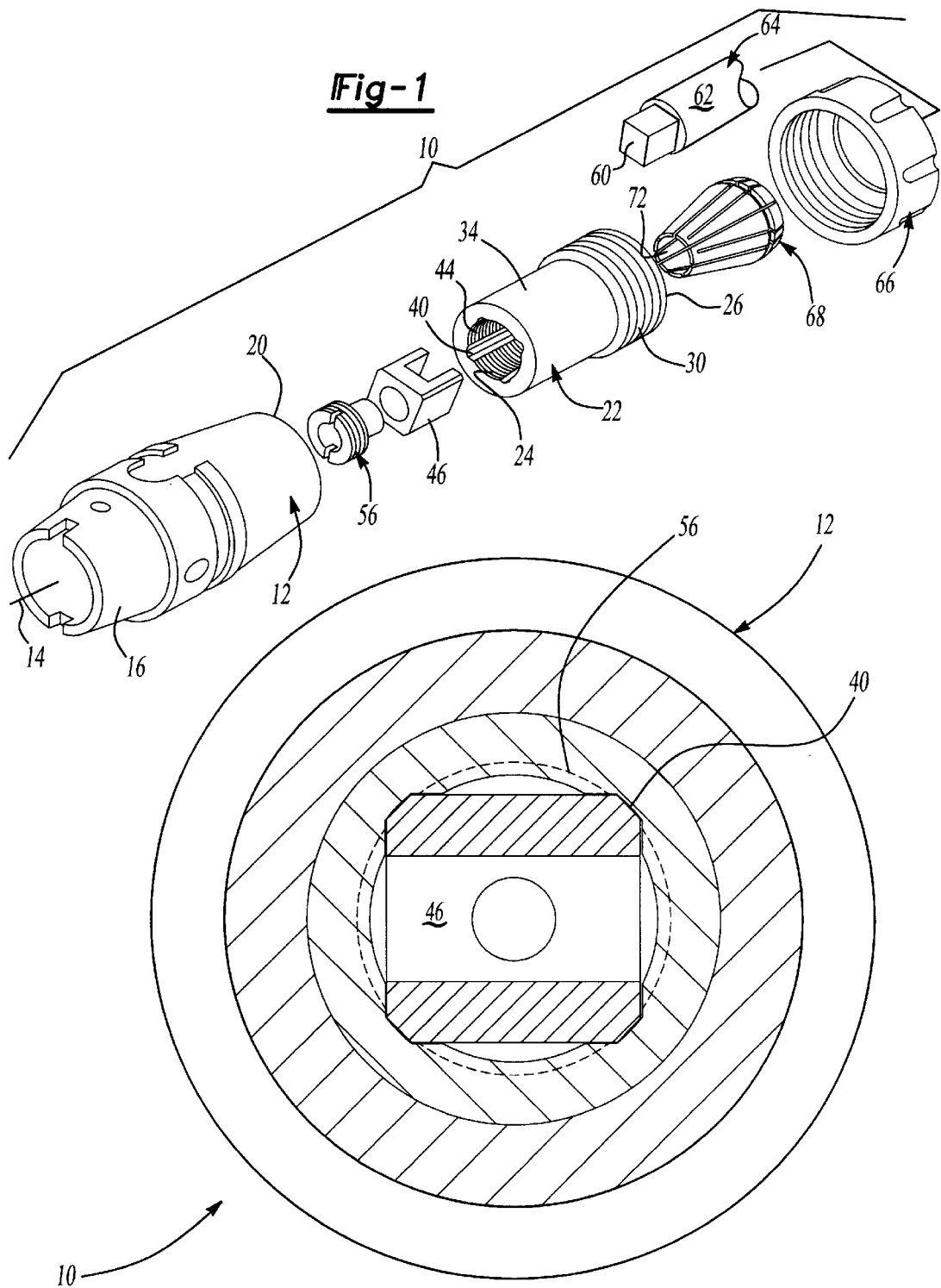
FIG. 1 is an exploded view illustrating a preferred embodiment of the present invention.
Figure 2:
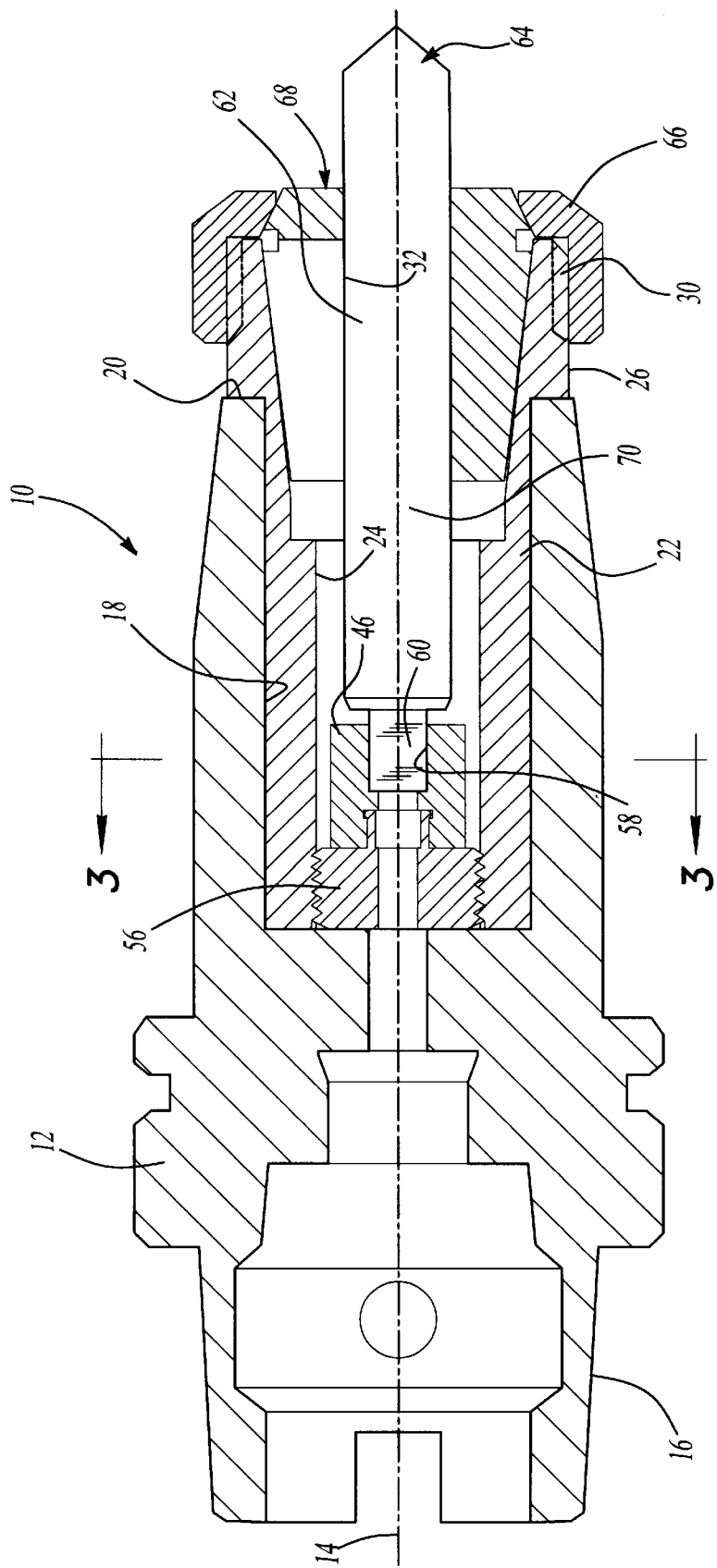
FIG. 2 is a longitudinal sectional view illustrating the preferred embodiment of the present invention.

With reference first to FIGS. 1 and 2, a preferred embodiment of the tool holder 10 of the present invention is there shown and includes a main body 12. The body 12 may be of any standard configuration, such as an HSK tool holder configuration, and is adapted to be rotatably driven by a spindle (not shown) along a predetermined axis 14 of rotation. An inner end 16 of the body 12 is adapted for attachment to the spindle while a cylindrical bore 18 is coaxially formed in an outer end 20 of the body 12. The cylindrical bore 18, furthermore, is of a predetermined diameter.

Still referring to FIGS. 1 and 2, the tool holder 10 further includes a tubular and cylindrical insert 22 having a throughbore 24. The insert 22 includes an enlarged diameter portion 26 at its outer end 28 and this enlarged diameter portion 26 includes external threads 30 for a reason to be subsequently described. Additionally, the throughbore 24 includes an outwardly flared conical portion 32 open to its outer end 28 as best shown in FIG. 2.

The outside diameter 34 of the insert 22 is slightly greater than the insert diameter of the body bore 18, at least at room temperature. Thus, in order to secure the insert 22 to the body 12, the body 12 is heated to at least a predetermined elevated temperature, e.g. 1000 F., at which temperature the body 12 thermally expands to an extent that the inside diameter of the body bore 18 is greater than the outside diameter 34 of the insert 22. At that time, the insert 22 is inserted into the body bore 18 until the enlarged diameter portion 26 abuts against the outer end 20 of the body 12. The body 12 is then allowed to thermally cool so that, upon cooling to room temperature, i.e. the normal operating temperature of the tool holder 10, the body 12 thermally contracts around the insert 22 thus rigidly securing the insert 22 to the body 12. Furthermore, upon cooling, the body 12 and insert 22 may be secured together with a high degree of concentricity between the axis 14 of the body 12 and the axis of the insert throughbore 24.

With reference now to FIGS. 1–3, the insert throughbore 24 includes a generally rectangular channel 40 adjacent its inner end 42. This channel 40, furthermore, includes internal threads 44 as best shown in FIG. 3. The threads 44 are interrupted, of course, at each corner of the channel 40.

A generally cube shaped boss 46 is axially slidably mounted in the channel 40 of the insert throughbore 24. However, the outside periphery of the boss 46 is substantially the same as the inner periphery of the channel 40 so that, while the boss 46 is axially slidably mounted within the channel 40, rotation of the boss 46 relative to the insert 22 is precluded.

A threaded fastener 56 is threadably mounted within the insert channel 40. This threaded fastener 56 is secured against axial movement to the boss 46 but may rotate relative to the boss 46. Consequently, rotation of the threaded fastener 56 axially moves the threaded fastener 56 within the insert throughbore 24 and thus simultaneously axially displaces the boss 46. The fastener 56 preferably provides one inch or even more axial adjustment. Any conventional means may be used to secure the fastener 56 to the boss 46. However, in the preferred embodiment of the invention, the threaded fastener 56 includes an outwardly extending ridge at its end facing the boss 46 which is slidably received within an annular groove formed on the boss 46. Preferably, the fastener 56 and boss 46 are simply press fit together.

As best shown in FIG. 2, the boss 46 includes a recess 58 at its end facing the free end of the insert 22. This recess 58 is dimensioned to receive a noncircular end portion 60 on the shank 62 of a tool 64. Thus, with the noncircular portion 60 positioned within the recess 58, rotation of the tool shank 62 relative to the insert 22, and thus relative to the body 12 of the tool holder 10, is precluded so that positive drive mechanism is achieved.

Referring again to FIGS. 1 and 2, in order to secure the tool 64 to the insert 22, an internally threaded collet 66 is threadably mounted to the externally threaded portion 30 of the insert in large diameter portion 26. This collet 66 includes a flexible locking ring 68 having an outer conical surface which flatly abuts against the conical surface 32 of the insert 22. The locking ring 68 also includes a throughbore 72 through which the tool shank 62 extends. Thus, with the tool 64 positioned into the insert 22 so that the end 60 of the tool shank 62 is positioned within the boss recess 58, tightening of the collet 66 causes the clamping ring 68 to frictionally engage the tool holder shank 62 thereby firmly, but removably, securing the tool 64 coaxially to the insert 22.

The collet 66 may be of the previously known collapsible type, but preferably is a precision machined single slot collet for improved accuracy.

The tool holder 10 thus enjoys many advantages over the previously known tool holders. First, since the insert 22 and body 12 are mechanically coupled together by thermal contraction, the concentricity between the insert and tool holder body may be maintained within very small tolerances. Furthermore, the insert and main body are mechanically locked together against even extremely high torque loads.

Unlike the previously known tool holders in which the tool holder is connected to the tool by a collet, the extension of the tool from the tool holder may be adjusted by adjusting the threaded fastener 56. Furthermore, even though the tool is adjustable relative to the tool holder, a positive drive mechanism is provided between the tool holder and the tool by means of the boss recess 58 and its cooperation with the noncircular end 60 of the tool holder shank 62.

In the event of relative rotation of the tool relative to the insert, i.e. tool spin out, as might occur during a tool failure, the interior bore 24 of the insert 22 may become damaged. In this event, the insert 22 is merely removed from the tool holder body 12 by heating the tool holder body 12 and thereafter replacing the insert 22 with a new insert. Consequently, the tool holder insert protects the main body 12 from damage.

Having described my invention, many modifications thereto will become apparent to those skilled in the art to which it pertains without deviation from the spirit of the invention as defined by the scope of the appended claims.

I claim:

1. A tool holder for a rotary tool having an elongated cylindrical shank comprising:

a body having a cylindrical bore with a predetermined inside diameter;

an elongated cylindrical insert having a throughbore, said insert having an outer diameter larger than said inside diameter of said body cylindrical bore;

means for removably and coaxially securing the tool shank to said insert within said insert throughbore;

wherein the tool includes a non-circular section at its end positioned within said cylindrical throughbore and comprising means within said insert throughbore for engaging said non-circular tool section and preventing rotation of the tool shank relative to said insert;

wherein said rotation preventing means comprises a boss having a non-circular outer periphery, said boss being axially slidably mounted in a like shaped channel at an inner end of said insert throughbore, said boss having a recess adapted to receive said non-circular end of the tool shank, and means for adjustably positioning said boss in said insert channel; and wherein said insert channel is internally dreaded and wherein said positioning means comprises an externally threaded fastener dimensioned to threadably engage said internal threads in said channel, and means for securing said fastener to said boss so that said boss is secured against axial movement relative to said fastener and so that said boss is rotatable relative to said fastener.

2. The invention as defined in claim 1 wherein said insert includes an externally threaded portion at one end and wherein said securing means comprises a collet having internal threads which threadably engage said threaded portion on said insert.

3. The invention as defined in claim 2 wherein said insert includes an outwardly extending conical section at an outer end of said insert throughbore.

4. The invention as defined in claim 3 wherein said collet includes a compression ring having an outer conical surface adapted to flatly abut against said conical section of said throughbore, and a cylindrical bore adapted to flatly abut against the tool shank.

5. The invention as defined in claim 1 wherein said means for securing said fastener to said boss comprises an outer circular ridge formed on an end of said fastener which faces said boss, said ridge being received within a like shaped annular groove in said boss.

\* \* \* \* \*